(12) United States Patent
Rades et al.

(10) Patent No.: US 7,735,838 B2
(45) Date of Patent: Jun. 15, 2010

(54) VEHICLE SUSPENSION WITH SELECTABLE ROLL STABILIZATION

(75) Inventors: Matthew James Rades, Oconomowoc, WI (US); David James Schedgick, Menasha, WI (US)

(73) Assignee: HUSCO International, Inc., Waukesha, WI (US)

( * ) Notice: Subject to any disclaimer, the term of this patent is extended or adjusted under 35 U.S.C. 154(b) by 135 days.

(21) Appl. No.: 12/195,071

(22) Filed: Aug. 20, 2008

(65) Prior Publication Data

US 2010/0044976 A1    Feb. 25, 2010

(51) Int. Cl.
    *B60G 17/005* (2006.01)
(52) U.S. Cl. ...................................... 280/5.507
(58) Field of Classification Search ... 280/5.506–5.509, 280/5.513, 5.514, 5.515, 6.159; 188/266.2, 188/282.2
    See application file for complete search history.

(56) References Cited

U.S. PATENT DOCUMENTS

| | | | |
|---|---|---|---|
| 3,701,499 A | 10/1972 | Schubert, et al. | |
| 4,887,699 A | 12/1989 | Ivers et al. | |
| 4,953,089 A | 8/1990 | Wolfe | |
| 5,044,455 A | 9/1991 | Tecco et al. | |
| 5,087,073 A * | 2/1992 | Lund | 188/266.2 |
| 5,193,845 A * | 3/1993 | Yokote et al. | 280/5.503 |
| 5,255,764 A | 10/1993 | Kurabayashi et al. | |
| 5,603,387 A | 2/1997 | Beard et al. | |
| 5,725,066 A | 3/1998 | Beard et al. | |
| 5,899,288 A | 5/1999 | Schubert et al. | |
| 6,394,238 B1 | 5/2002 | Rogala | |
| 6,575,484 B2 | 6/2003 | Rogala et al. | |
| 6,612,375 B2 | 9/2003 | Rogala | |
| 6,834,736 B2 | 12/2004 | Kramer et al. | |
| 7,377,523 B2 | 5/2008 | Schedgick et al. | |
| 7,390,002 B2 * | 6/2008 | Kasamatsu | 280/124.159 |

* cited by examiner

*Primary Examiner*—Faye M. Fleming
(74) *Attorney, Agent, or Firm*—Quarles & Brady LLP; George E. Haas

(57) ABSTRACT

A hydraulic suspension system for a vehicle includes a pair of cylinders on opposite sides of the vehicle. Each cylinder is divided by a piston into two chambers. When the vehicle is not making a significant turn, a switching valve connects the chambers in the same cylinder together and when a significant turn occurs, the switching valve cross connects the chambers of the two cylinders. That cross connection increases resistance of the suspension system to roll of the vehicle, as compared to when the cylinder chambers are not cross connected. A load leveling function also is included in the hydraulic suspension system.

15 Claims, 1 Drawing Sheet

VEHICLE SUSPENSION WITH SELECTABLE ROLL STABILIZATION

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to suspension systems for off-road equipment, such as agricultural tractors, and more particularly to such suspension systems that are dynamically adjustable in response to load changes and operation of the vehicle.

2. Description of the Related Art

Off-highway equipment, such as construction and agricultural vehicles, can carry widely varying loads. When a relatively heavy load is applied to the equipment, the vehicle body is forced downward with respect to the axles supporting the wheels of the vehicle. This results in compression of the suspension which can adversely affect the maneuverability of the vehicle. On the other hand, if the suspension is configured for very heavy loads, the vehicle will have an undesirable ride under light load conditions.

As a result, many vehicles have automatic load leveling systems which employ separate hydraulic cylinders between the axle and the frame on opposite sides of the vehicle. When a heavy load is applied to the frame, the drop of the frame is sensed and additional hydraulic fluid is applied to the cylinders to raise the frame to the desired distance from the axle. Thereafter, when that load is removed from the vehicle and the frame rises significantly above the axle, hydraulic fluid is drained from the cylinders to lower the frame with respect to the axle. This type of automatic hydraulic load leveling system ensures that the frame and axle are maintained at the desired separation regardless load applied to the vehicle.

The suspension undergoes another condition when the vehicle makes a relatively tight turn. At that time, the upper part of the vehicle body tips outward causing a roll effect that compresses the suspension cylinder on the outside of the turn and extends the cylinder on the inside of the turn. A greater force is applied to the outside cylinder than is encountered by the inside cylinder. In one configuration of the suspension, fluid in the outside cylinder is forced from the head chamber into the rod chamber. That flow is restricted because the volume of the rod chamber expands less that the contraction of the head chamber due the presence of the piston rod in the rod chamber. The restriction provides resistance to the roll motion. The amount of resistance determined by fixed size of the cylinders, which is selected based on the characteristics of the vehicle.

The fixed roll resistance, while being acceptable for many vehicles, is not optimal for vehicles in which the roll forces vary significantly under different operating conditions. For example, an agricultural vehicle, that is used to spray pesticides and herbicides on crop fields, has spray heads mounted on retractable booms that project laterally from each side of the vehicle body. The roll forces produced when the booms are extended for spraying are significantly greater than the roll forced when the booms are retracted against the body for travel to and from the field. Therefore, suspension cylinders selected to counter roll when the booms are retracted may not adequately counter the roll when the booms are extended. Selecting the suspension cylinders to counter roll of the vehicle with extended booms provides poor ride characteristics during both turning and traveling straight ahead.

SUMMARY OF THE INVENTION

A hydraulic suspension system is provided for a vehicle that has a tank for holding hydraulic fluid and a source of pressurized fluid, such as a pump, connected to the tank. The hydraulic suspension system includes a pair of hydraulic cylinders adjacent opposite sides of the vehicle. The first cylinder has a first piston that defines a first chamber and a second chamber within that cylinder, and the second cylinder has a second piston that defines a third chamber and a fourth chamber within the second cylinder.

A switching valve comprises separate ports connected to the first chamber, the second chamber, the third chamber, and the fourth chamber. In a first position, the switching valve provides a first fluid path between the first chamber and the second chamber, and a second fluid path between the third chamber and the fourth chamber. In a second position, the switching valve provides a third path between the first chamber and the third chamber, and a fourth path between the second chamber and the fourth chamber.

The switching valve is placed into the second position when the vehicle is making a turn. That state cross couples the two suspension cylinders, so that fluid being forced from one cylinder is fed to the other cylinder. The cross coupling increases the resistance of the suspension system to vehicle roll. When the vehicle is not turning, the switching valve is in the first position in which fluid forced from a chamber of a cylinder is fed to the other chamber of the same cylinder.

In a preferred embodiment of the hydraulic suspension system, a sensor provides an indication when the vehicle is making a turn and a controller responds to that indication by placing the switching valve in the second position.

Another aspect of the present hydraulic suspension system includes load leveling. For that function, a directional control valve connects a common node to either the source of pressurized fluid or to the tank. A first load leveling valve selectively opens and closes fluid communication between the common node and the first chamber, and second load leveling valve selectively opens and closes fluid communication between the common node and the third chamber. This enables position of the pistons in the cylinders to be substantially centered under varying static load conditions.

DETAILED DESCRIPTION OF THE INVENTION

Figure 1:
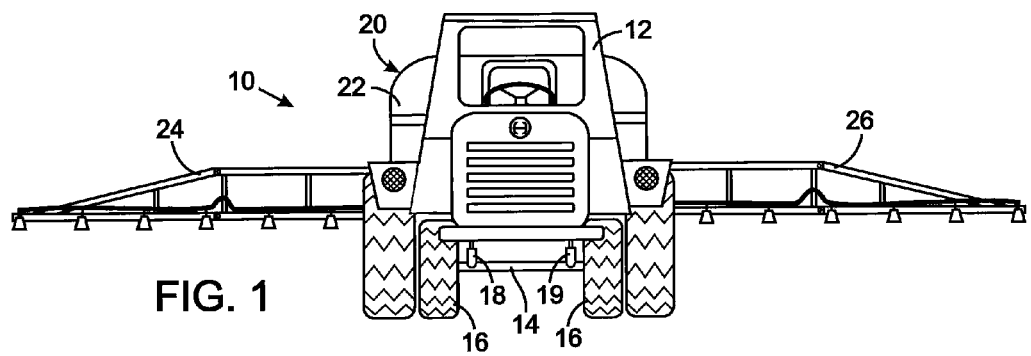
FIG. 1 is a front view of an off-highway vehicle that incorporates a suspension system according to the present invention.

With initial reference to FIG. 1, a vehicle, such as an agricultural tractor 10, has a body 12 with a frame that is mounted on two axles to which the wheels of the vehicle are attached. For example, the front axle 14, with a pair of wheels 16, is coupled to the body 12 by suspension system that includes a pair of double-acting hydraulic cylinders 18 and 19. As will be described, pressurized hydraulic fluid is applied to and drained from the cylinders 18 and 19 to control the distance that the body 12 of the tractor is above the front axle 14. In addition, transfer of fluid between chambers of the cylinders dampens vibrations from being transmitted from the axles to the vehicle body.

The particular agricultural tractor 10 is configured for spraying a field of crops with a liquid chemical and has a conventional sprayer 20 mounted at its rear. The sprayer 20 comprises a tank 22 for the chemical to be sprayed and a pair of retractable booms 24 and 26 extending laterally outward from each side to the tractor 10. When the booms are 24 and 26 extended, as illustrated, the tractor tends to roll from side to side, especially when turning on uneven ground in a field.

Figure 2:
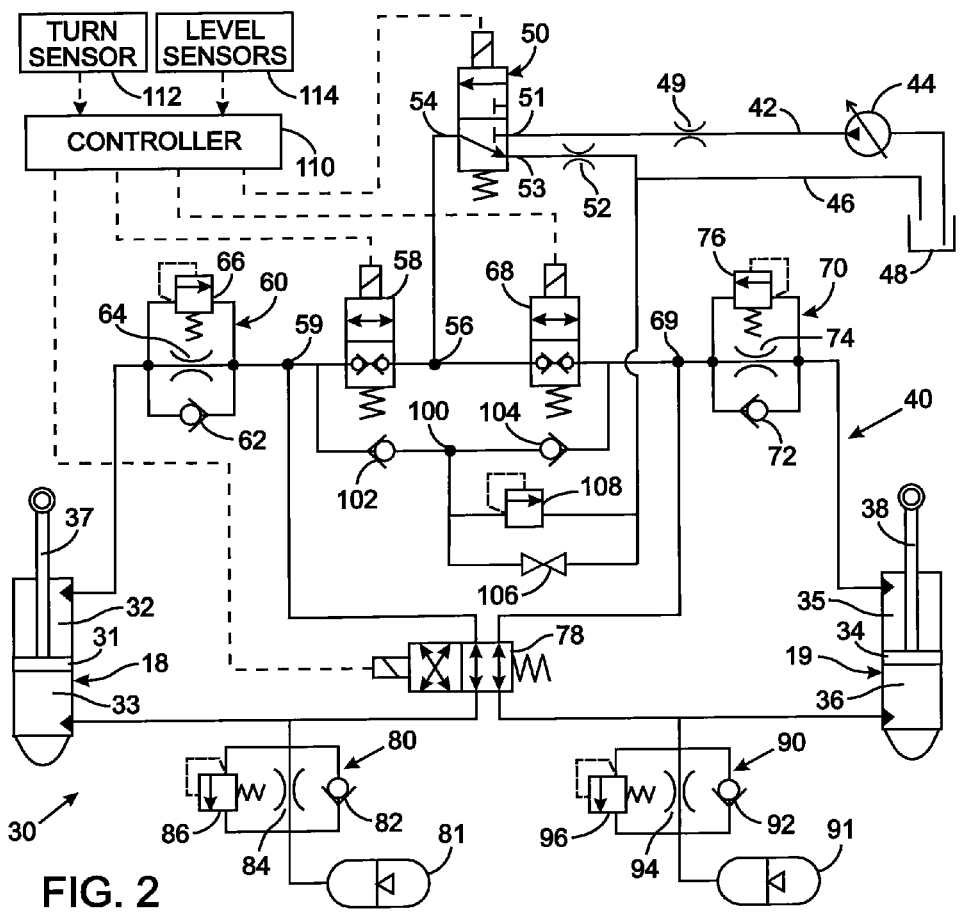
FIG. 2 is a schematic hydraulic circuit diagram of the suspension system.

The tractor 10 is provided with a suspension system 30 that counters the tendency of the tractor to roll and the portion of that system for the front axle 14 is illustrated in FIG. 2. A similar portion is provided for the rear axle. The suspension system 30 includes the two double-acting cylinders 18 and 19, each having an internal bore in which a piston is slideably received. Specifically, the first cylinder 18 has a rod chamber 32 and a head chamber 33 formed on opposite sides of a piston 31 that slides inside that cylinder. Likewise the second cylinder 19 includes a piston 34 that separates a rod chamber 35 and a head chamber 36 within that cylinder. The rod and head chambers vary in volume as the associated piston moves within the respective cylinder. The first and second cylinders 18 and 19 are attached to either the front axle 14 or the frame, while each piston rod 37 and 38 is attached to the other one of the front axle 14 and the frame.

The suspension system 30 includes a hydraulic circuit 40 that has a supply line 42 which receives pressurized fluid from the outlet of a pump 44 and sends fluid back through a return line 46 to a tank 48, from which the pump draws fluid. The supply line 42 is coupled via a supply orifice 49 to an inlet 51 of a solenoid operated directional control valve 50, and the return line 46 is coupled by a return orifice 52 to an outlet 53 of the first control valve. The two-position directional control valve 50 has a spool operated by a solenoid to connect either the inlet 51 or the outlet 53 to a common port 54 which is connected to a common node 56 in the hydraulic circuit 40.

A first load leveling valve 58, that is solenoid operated, selectively connects the common node 56 to a first node 59. The first node 59 is coupled by a first subcircuit 60 to the rod chamber 32 of the first cylinder 18. The first subcircuit 60 comprises a first check valve 62, a first orifice 64, and a first pressure relief valve 66, all connected in parallel. Fluid is able to flow through the first check valve 62 only in a direction from the first node 59 to the rod chamber 32. The first pressure relief valve 66 opens when pressure in the rod chamber 32 exceeds a predefined level. The first load leveling valve 58 controls leveling of the first cylinder 18 on the right side of the vehicle 10.

Similarly, the common node 56 is connected to a second node 69 by a second load leveling valve 68, that is solenoid operated. A second subcircuit 70 connects the second node 69 to the rod chamber 35 of the second cylinder 19 and comprises a second check valve 72, a second orifice 74, and second pressure relief valve 76, all connected in parallel. The second check valve 72 permits fluid to flow there through only in a direction from the second node 69 to the rod chamber 35. The second pressure relief valve 76 opens when pressure within the rod chamber 35 exceeds a predefined magnitude. The second load leveling valve 68 controls leveling of the second cylinder 19 on the left side of the vehicle 10.

The second and third nodes 59 and 69 are connected to a pair of ports of a two-position switching valve 78. Two other ports of the switching valve 78 are connected to the head chambers 33 and 36 of the two cylinders 18 and 19, respectively. In one position, the solenoid-operated switching valve 78 connects the first node 59 to head chamber 33 and the second node 69 to the other head chamber 36. In the other position, referred to as the cross-coupling position, the solenoid-operated switching valve 78 connects the first node 59 to the other head chamber 36 and the second node 69 to head chamber 33.

The head chamber 33 of the first cylinder 18 also is connected by a third subcircuit 80 to a first accumulator 81. The third subcircuit 80 comprises a parallel arrangement of a third check valve 82, a third orifice 84, and a third pressure relief valve 86. The third check valve 82 permits fluid to flow only in a direction from the first accumulator 81 toward the head chamber 33 of the first cylinder 18. The third pressure relief valve 86 opens in response to pressure in that head chamber 33 exceeding a predefined threshold level.

The head chamber 36 of the second cylinder 19 is connected by a fourth subcircuit 90 to a second accumulator 91. The fourth subcircuit 90 comprises another parallel arrangement of a fourth check valve 92, a fourth orifice 94, and a fourth pressure relief valve 96. The fourth check valve 92 permits fluid to flow only in a direction from the second accumulator 91 to the respective head chamber 36. The fourth pressure relief valve opens in response to pressure within the head chamber 36 of the second cylinder 19 exceeding a predefined magnitude.

The first node 59 is connected to a third node 100 by a fifth check valve 102 that allows fluid to flow from the second node to the third node. A sixth check valve 104 permits fluid to flow only from the second node 69 to the third node 100. The third node 100 is connected by a manual override valve 106 to the tank return line 46. The manual override valve 106 permits the hydraulic circuit 40 to be drained for servicing. The logic provided by the fifth and sixth check valves 102 and 104 connected to the third node 100 enables excessive pressure at the second and third nodes 59 and 69 to be released into the tank return line 46 by a fifth pressure relief valve 108 connected to the third node 100.

The four solenoid valves 50, 58, 68 and 78 are operated by signals produced by a controller 110. The controller may be a microcomputer-based device that executes a control program which governs operation of the suspension system 30. Alternatively, the controller may be a circuit with hard-wired logic. The controller 110 receives an input signal from a turn sensor 112 that detects when the tractor 10 is making a turn. For example, the sensor may detect when the vehicle's steering mechanism turns the front wheels more than a predefined amount, as occurs when a significant turn is being performed. Minor changes in the position of the wheels, as commonly occur when the tractor is traveling in a generally straight, forward direction, are not significant enough to trigger the sensor 112. Other types of sensors, such as a tilt detector or a lateral force sensor, can be used as the turn sensor 112. A pair of level sensors 114 on each side of the front axle 14 detect the distance between that axle and the frame of the tractor body 12.

When the tractor 10 is traveling forward across a field, the turn sensor 112 indicates that the front wheels 16 are not turned a significant amount. The controller 110 responds to that sensor indication by maintaining the switching valve 78 in the illustrated de-activated position. In that position, the head chamber 33 of the first cylinder 18 is connected to the first node 59, and the head chamber 36 of the second cylinder 19 is connected to the second node 69. At this time, the two cylinders 18 and 19 act as shock absorbers to soften any bouncing of the tractor body with respect to the front axle 14 as the vehicle travels over the ground. When the tractor 10 encounters a bump, the front axle 14 moves upward applying force that compresses the piston-cylinder assemblies, thereby forcing fluid from the head chamber 33 through the switching valve 78 to the second and third nodes 59 and 69. Because the first and second load leveling valves 58 and 68 are in the closed position, the fluid entering the second and third nodes 59 and 69, respectively, force the first and second check valves 62 and 72 open, thereby sending that fluid into the expanding rod chambers 32 and 35. Because part of the volume of each rod chamber is occupied by the respective piston rod 37 or 38, a greater amount of fluid is being pushed out of the head chambers 33 and 36 than can be accommodated in the expanding rod chambers 32 and 35. That excess fluid from the head chamber 33 is forced through the third orifice 84 into the first accumulator 81 and the excess fluid from the other head chamber 36 flows through the fourth orifice 94 into the second accumulator 91. The restriction of that flow dampens the vehicle motion. The excess fluid is stored under pressure in the accumulators.

The movement of the vehicle is dampened by the flow of excess fluid through the respective orifices 84 and 94 associated with the two accumulators 81 and 91, respectively. If the bump is severe, the relatively high pressure created in the head chambers 33 and 36 may cause the respective accumulator relief valves 86 and 96 to open thereby increasing the transfer of fluid into the accumulators 81 and 91.

Thereafter, when the body 12 of the vehicle 10 rebounds and rises away from front axle 14, the piston-cylinder assemblies extend thereby expanding the two head chambers 33 and 36 and contracting the rod chambers 32 and 35. This motion forces fluid out of both rod chambers 32 and 35 back through the orifices 64 and 74 of the first and second subcircuits 60 and 70, respectively. The restriction of that flow by those orifices dampens the vehicle motion. This flow continues through the switching valve 78 into the respective head chambers 33 and 36. If the pressure within the rod chambers is very high, the two pressure relief valves 66 and 76 open, allowing that pressure to be relieved into the associated head chamber. Because of the volume occupied by the respective piston rods 37 and 38 the fluid exiting the associated rod chambers 32 and 35 of the cylinders 18 and 19 is insufficient to fill entirely the expanding volume of the head chambers 33 and 36. The additional amount of fluid to fill the head chambers 33 and 36 is supplied from the associated accumulator 81 or 91. Specifically, some fluid flows from the first and second accumulators 81 and 91 through the associated third or fourth check valve 82 or 92 into the respective head chamber 33 or 36.

When the turn sensor 112 detects that the front wheels 16 are turning by a significant amount, the controller 110 responds by activating the switching valve 78 to move into the cross-coupling position. In this position, the cylinders on opposite sides of the vehicle are interconnected. Specifically, the head chamber 33 of the first cylinder 18 is connected to the second node 69 and then through second orifice 74 to the rod chamber 32 of the second cylinder 19. The cross-coupling position of the switching valve 78 also provides another path from the head chamber 36 of the second cylinder 19 through the first node 59 and the first orifice 64 to the rod chamber 32 of the first cylinder 18.

As the vehicle 10 turns, the cylinder that is on the outside of the turn is compressed, while the other cylinder on the inside of turn is extended.

Assuming that the first cylinder 18 is in compression, fluid is pushed out of its head chamber 33 through the switching valve 78 to the second node 69. The pressure of that fluid forces the second check valve 72 to open allowing the fluid to flow toward the rod chamber 35 of the second cylinder 19. However, the roll of the vehicle also tends to extend the second cylinder 19, thereby tending to force fluid out of its rod chamber 35. Nevertheless, a greater amount of force is exerted the outside cylinder, in this case the first cylinder 18, than the inside cylinder 19. As a consequence, some fluid forced from the head chamber 33 of the first cylinder enters the rod chamber 35 of the second cylinder 19 thereby counteracting the effects of vehicle roll.

At the same time, the rod chamber 32 of the first cylinder 18 that is at the outside of the turn is expanding, thereby attempting to draw fluid from the head chamber 36 of the second cylinder 19 through the cross coupled switching valve 78 and a now opened first check valve 62. This action tends to retract the second cylinder 19, further countering the roll forces which are tending to extend that cylinder and piston assembly. These combined actions due to the cross coupling of the two cylinders 18 and 19 via the switching valve 78 provide a more dramatic counter action of the roll forces, than if the switching valve was remained in its illustrated non-crossover state.

A similar, but reversed, anti-roll action occurs when the vehicle turns in the opposite direction and the second cylinder 19 is on the outside of the turn.

The suspension hydraulic circuit 40 also provides a load leveling function. The level sensors 114 detect the distance between the axle 14 and the body 12 of the tractor 10, which distance varies depending upon the magnitude of the load that the tractor is carrying. Optimally it is desirable that the pistons 31 and 34 be centered along the travel distance within the two cylinders 18 and 19 under a static load condition. When the level sensors 114 detect that the axle to body distance is smaller than is desired, the controller 110 responds by activating the load leveling mode to raise the body 12 with respect to the axle 14. This is accomplished by activating the directional control valve 50 to apply pressurized fluid from the supply line 42 to the common node 56. Depending upon whether only one side or both sides of the vehicle need to be raised, one or both of the load leveling valves 58 and 68 will be opened to convey that pressurized fluid to the second and third nodes 59 and 69, respectively. The fluid continues to flow from node 59 or 69 through the de-energized switching valve 78 into the respective head chamber 33 or 36 of the cylinders 18 and 19. Although fluid also is conveyed through the first and second subcircuits 60 and 70 to the rod chambers 32 and 35, the piston area differential between the head and rod chambers in each cylinder, creates a force imbalance that raises the pistons 31 and 34. Raising the pistons in the cylinders thereby raises the tractor body 12 with respect to the axle 14. When the level sensors 114 indicate that the body is at the proper distance, the load leveling valves 58 and 68 are closed to maintain that position.

Alternatively, when the level sensors 114 indicate that the body 12 is too great a distance above the axle 14, as occurs after a heavy load has been removed from the tractor, the controller 110 compensates by lowering the body. That is accomplished by deenergizing the directional control valve 50 so that the common node 56 is connected as shown to the return line 46 for the tank 48. At that time, one or both of the load leveling valves 58 and 68 is opened, depending upon whether both or only one of the sides of the vehicle needs to be lowered. This causes fluid to flow from the associated head chamber 33 and 36 through the deenergized switching valve 78 to the tank 48. As the head chambers 33 and 36 of each cylinder decrease in size the rod chambers 32 and 25 expand. The additional fluid to fill the expanding rod chambers is obtained from the associated second and third nodes 59 and 69 through the opening of the second and third check valves 62 and 72. When the body 12 has lowered to the appropriate point as indicated by the level sensors 114, the controller 110 closes the two load leveling valves 58 and 68.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. A hydraulic suspension system for a vehicle comprising:
a first cylinder adjacent one side of the vehicle and having a first piston that defines a first chamber and a second chamber within the first cylinder;
a second cylinder adjacent another side of the vehicle and having a second piston that defines a third chamber and a fourth chamber within the second cylinder; and
a switching valve with separate ports connected to the first chamber, the second chamber, the third chamber, and the fourth chamber, and having a first position which provides a first path between the first chamber and the second chamber and a second path between the third chamber and the fourth chamber, and a second position which provides a third path between the first chamber and the third chamber and a fourth path between the second chamber and the fourth chamber.

2. The hydraulic suspension system as recited in claim 1 further comprising a first orifice between the switching valve and the first chamber; and a second orifice between the switching valve and the third chamber.

3. The hydraulic suspension system as recited in claim 2 further comprising a first check valve in parallel with the first orifice; and a second check valve in parallel with the second orifice.

4. The hydraulic suspension system as recited in claim 2 further comprising a first pressure relief valve in parallel with the first orifice and opening in response to pressure in the first chamber; and a second pressure relief valve in parallel with the second orifice and opening in response to pressure in the third chamber.

5. The hydraulic suspension system as recited in claim 1 further comprising a first accumulator in fluid communication with the second chamber; and a second accumulator in fluid communication with the fourth chamber.

6. The hydraulic suspension system as recited in claim 1 further comprising:
a common node;
a directional control valve connecting the common node selectively to a source of pressurized fluid and a tank;
first load leveling valve opening and closing fluid communication between the common node and the first chamber; and
second load leveling valve opening and closing fluid communication between the common node and the third chamber.

7. The hydraulic suspension system as recited in claim 1 further comprising:
a sensor that detects when the vehicle is turning; and
a controller, that in response to the sensor detecting that the vehicle is turning, operates the switching valve to change positions.

8. A hydraulic suspension system for a vehicle that has a tank for hydraulic fluid and a pump connected to the tank, the hydraulic suspension system comprising:
a first node, a second node, and a common node;
a first cylinder adjacent one side of the vehicle and having a first piston that defines a first chamber and a second chamber within the first cylinder;
a second cylinder adjacent another side of the vehicle and having a second piston that defines a third chamber and a fourth chamber within the second cylinder;
a first orifice connected between the first node and the first chamber;
a second orifice connected between the second node and the second chamber;
a switching valve having a first position which provides a first path between the second chamber and the first node and a second path between the fourth chamber and the second node, and having a second position which provides a third path between the second chamber and the second node and a fourth path between the fourth chamber and the first node;
a first load leveling valve opening and closing fluid communication between the common node and the first node;
a second load leveling valve opening and closing fluid communication between the common node and the second node; and
a directional control valve connecting the common node selectively to a source of pressurized fluid and to the tank.

9. The hydraulic suspension system as recited in claim 8 further comprising a first check valve in parallel with the first orifice; and a second check valve in parallel with the second orifice.

10. The hydraulic suspension system as recited in claim 8 further comprising a first pressure relief valve in parallel with the first orifice and opening in response to pressure in the first chamber; and a second pressure relief valve in parallel with the second orifice and opening in response to pressure in the third chamber.

11. The hydraulic suspension system as recited in claim 8 further comprising a first accumulator in fluid communication with the second chamber; and a second accumulator in fluid communication with the fourth chamber.

12. The hydraulic suspension system as recited in claim 11 further comprising a third orifice coupling the first accumulator to the second chamber; and a fourth orifice coupling the second accumulator to the fourth chamber.

13. The hydraulic suspension system as recited in claim 8 further comprising:
a first accumulator;
a subcircuit coupled between the first accumulator to the second chamber and comprising first parallel arrangement of a third orifice, a check valve and a pressure relief valve; and
another subcircuit coupled between the second accumulator to the fourth chamber and comprising a second parallel arrangement of a fourth orifice, another check valve and another pressure relief valve.

14. The hydraulic suspension system as recited in claim 13 wherein:
in the first parallel arrangement, the check valve allows fluid flow only in a direction from the first accumulator toward the second chamber, and the pressure relief valve opens in response to pressure in the second chamber; and
in the second parallel arrangement, the check valve allows fluid flow only in a direction from the second accumulator toward the fourth chamber, and the pressure relief valve opens in response to pressure in the fourth chamber.

15. The hydraulic suspension system as recited in claim 8 further comprising:
a supply orifice connected between the directional control valve and the source of pressurized fluid; and
a return orifice connected between the directional control valve and the tank.

* * * * *